United States Patent
Washimi et al.

[15] 3,674,679
[45] July 4, 1972

[54] PROCESS AND APPARATUS FOR THE THERMAL CRACKING OF HEAVY HYDROCARBON OILS

[72] Inventors: Koichi Washimi; Masaaki Kanbayashi, both of Fukushima; Toshio Kanai; Akihiro Fujimori, both of Kanagawa, all of Japan

[73] Assignees: Kureka Kagaku Kogyo Kabushiki Kaisha, Tokyo; Chiyoda Kako Kensetsu Kabushiki Kaisha, Kanagawa, Japan

[22] Filed: Feb. 24, 1970

[21] Appl. No.: 13,240

[30] Foreign Application Priority Data

Feb. 21, 1969 Japan.................................44/12543

[52] U.S. Cl...........................208/48, 208/48 Q, 208/130, 23/284
[51] Int. Cl.......................................C10g 9/16, C10g 9/18
[58] Field of Search.................208/48 Q, 130, 48 R; 23/284; 260/676, 683

[56] References Cited

UNITED STATES PATENTS

| | | | |
|---|---|---|---|
| 3,408,417 | 10/1968 | Sogawa et al. | 260/683 |
| 3,498,753 | 3/1970 | Hokari et al. | 208/130 |
| 3,015,619 | 2/1962 | Wimmer et al. | 208/48 |
| 2,721,888 | 10/1955 | Harris | 208/284 |
| 3,244,765 | 4/1966 | Fauser | 260/679 |

*Primary Examiner*—Herbert Levine
*Attorney*—Sughrue, Rothwell, Mion, Zinn and Macpeak

[57] ABSTRACT

Improvement in thermal cracking of heavy hydrocarbon oils comprising the introduction of a moving film of falling oil on the surfaces of the reaction zone. Apparatus to accomplish this effect is also disclosed The moving oil film prevents the formation of coke otherwise resulting from contact between the heated reactor walls and normally liquid reaction products.

11 Claims, 1 Drawing Figure

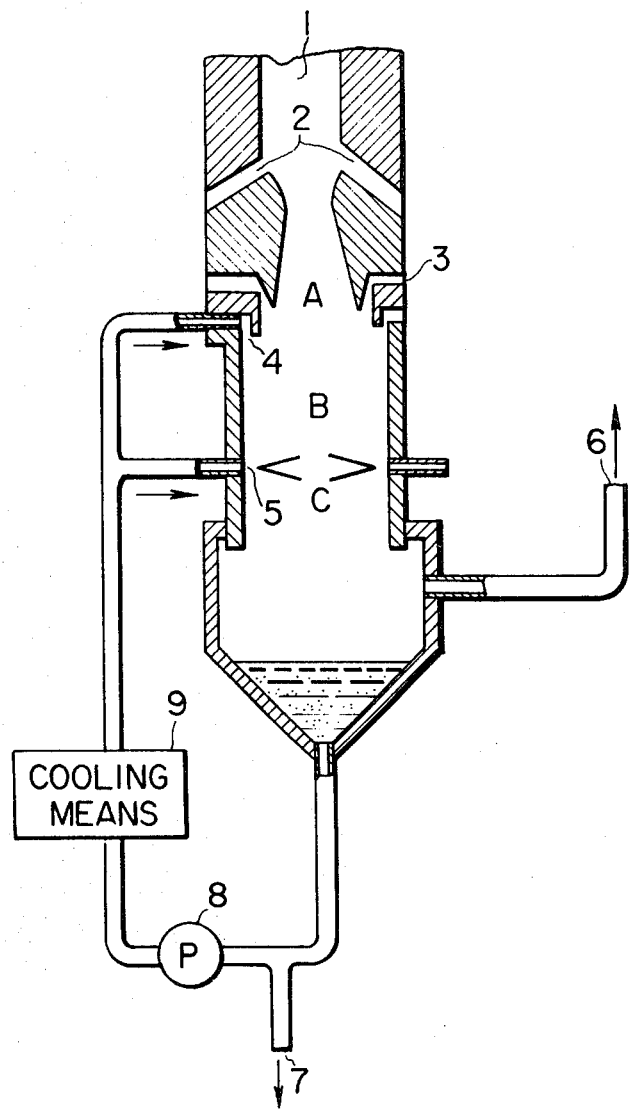

3,674,679

PROCESS AND APPARATUS FOR THE THERMAL CRACKING OF HEAVY HYDROCARBON OILS

BACKGROUND OF THE INVENTION

1. Field of the Invention

The present invention relates to an improved process and apparatus for thermally cracking heavy hydrocarbon oil, such as crude oil or other heavy oil, for example, a heavy gas oil.

2. Description of the Prior Art

When a heavy hydrocarbon oil is mixed with a gaseous medium heated to above 800°C. by directly blowing the hydrocarbon oil into said medium and then introducing the mixture into a reaction chamber wherein the gaseous mixture is subjected to a cracking reaction, a disadvantage is encountered in that a heavy liquid oil formed by the thermal cracking is deposited on the inside wall of the reaction chamber and this heavy liquid oil is gradually carbonized at the high temperature in the reaction chamber and accumulates there.

Thus, an object of the present invention is to provide a process and apparatus for the thermal cracking of heavy hydrocarbon oils wherein the cracking reaction may be carried out without being accompanied with the aforesaid difficulty.

SUMMARY OF THE INVENTION

That is, it has been discovered that when a portion of the heavy oil formed by the cracking allowed to fall along the surface of the inside wall of the reaction chamber in sufficient amounts to wet the inside wall of the reaction chamber and to form a continuous falling film along the wall, the temperature of the falling film is maintained sufficiently low by the re-evaporation of the heavy oil from the surface of the falling film and the latent heat of the liquid itself and, further, the falling liquid is withdrawn from the high temperature reaction chamber in a short period of time, whereby carbonization of the heavy oil and the accumulation of coke on the inside wall of the reaction chamber are prevented.

DETAILED DESCRIPTION OF THE INVENTION

Thus, the apparatus of the present invention is so constructed that the liquid oil formed by the thermal cracking of the heavy hydrocarbon oil is collected by condensing it from the gas formed during the cracking reaction and a part of the liquid oil thus collected is recycled to the reaction chamber and allowed to fall by gravity along the inside wall of the vertically placed reaction chamber, thus forming a uniform film moving in the same direction as the gaseous stream.

Further, a large proportion of the cooled heavy oil is introduced into the reaction zone through the wetted inside wall to quickly cool the gas and quench the cracking reaction, whereby the heavy oil intending to deposit on the inside wall of the reaction chamber is absorbed into the falling liquid and is quickly withdrawn from the reaction system. In this case, of course, the amount of the heavy oil to be circulated to the inside wall of the reaction chamber must be sufficient to forming a stable falling film along the inside wall of the reaction chamber.

It is also necessary that, in order to prevent the temperature of the oil from being increased to a point at which the produced heavy oil polymerizes, the amount of the heavy oil to be introduced along the inside wall is sufficient to absorb both the heat from the gas in the reaction chamber and the heat of evaporation of light oil from the surface of the oil film.

Usually, if the heating time is short, the oil formed in the thermal cracking reaction is sufficiently stable up to 500°C. and hence the amount of the liquid must be so selected that the temperature of the oil does not rise above 500°C.

In the cracking apparatus illustrated in the accompanying drawing, at the location where the feed oil is introduced and mixed into the high temperature gaseous heating medium, no accumulation of coke occurs even in the absence of introduced liquid, since such location is in the initial area of the thermal cracking zone. However, the difficulty is encountered that the temperature of the wall is lowered in the area adjacent the boundary along which the heavy oil is introduced resulting in the deposition of coke at this point.

In another embodiment of the present invention, this difficulty is also overcome. That is, by flowing along the boundary wall a small amount of a high-temperature gas, such as steam heated to a temperature higher than 800°C., in a thin gaseous film, thereby thermally shielding the boundary wall from the relatively cooler wetted wall, the aforesaid difficulty can be overcome. In this case, it is necessary, in order to prevent the falling film of liquid from being scattered, to flow the high-temperature gas in a thin film in the direction of flow of the heavy oil film.

As the oil which forms the falling film in the apparatus of this invention, any oil which is compatible with the liquid oil formed by the thermal cracking of a heavy hydrocarbon oil and is thermally stable can be used. It is economical to circulate the liquid oil formed by the thermal cracking as mentioned above.

In the present invention, the oil employed to rapidly cool the reaction product gas may be introduced into the reaction chamber at desired positions of the wall thereof in order to wet the wall and hence, for example, by changing the positions of introduction of the oil, the reaction time can be controlled to prevent the formation of coke even during the course of the reaction without the necessity of employing mechanically movable parts.

The present invention will be more fully illustrated by reference to the following example and the accompanying drawing.

EXAMPLE

In the apparatus illustrated in the drawing, high-temperature steam heated to 2,000°C. by regenerative heating means is introduced into the vertical reaction chamber through steam inlet 1 at the rate of 500 kg./hour. Crude oil having an API gravity of 37 is sprayed into the steam through four spray nozzles 2 at the rate of 100 liters/hour. The reaction chamber wall in the area between the mixing section of the high-temperature steam and the feed crude oil and the section (A), where the mixed reactant reaches in a retention time of 0.002 second, is made of an alumina refractory material and the temperature of the wall of this section is maintained at a temperature higher than 800°C. by the insulating effect of the refractory material. The wet-wall reaction section (B), having a liquid oil inlet 4 at its upper portion (B) is provided at that portion of the reaction chamber where the reaction mixture reaches in a retention time of 0.005 second. Inlet 5, for spraying a cooling oil into the reaction chamber through the falling oil film, comprises a plurality of inlet means positioned in the wall at outlet portion (C) of the reaction chamber. Further, inlet 3 is provided at the boundary section (A) between the alumina refractory wall and the wetted wall and high temperature steam heated to 800°C. is introduced into the chamber at the rate of 20 kg./hour through said inlet 3. The temperature of the gas at outlet (C) of the reaction chamber is about 900°C. The temperature of the gas after being cooled by the cooling oil introduced though the inlet 5 is 150°C. The liquid condensed product oil is stored in the bottom section. The liquid product oil, separated from the gaseous products and accumulated at the bottom of the chamber, is then circulated through pump 8 and cooling means 9 to inlet 4 to supply the wall-wetting liquid and to inlet 5 for the purpose of spraying cooling oil into the chamber through the liquid wetting film. In this case, by flowing the liquid oil to wet the wall of the reaction chamber, cooled to 100°C., at a rate of 300 liters/hour, the temperature of the falling oil film at the end of the reaction zone before quenching is maintained at 130°C. Further, the quench oil is circulated at the rate of 5,000liters/hour. The gaseous reaction products are removed through outlet 6.

Furthermore, by withdrawing a part of the product oil from conduit 7 at the rate of 35 liters/hour, the amount of oil present in the system is maintained at an even level. The product oil recovered through conduit 7 is an aromatic oil having an initial boiling point of 200°C. and a final boiling point of 450°C. (calculated at normal pressure), the viscosity of the aromatic oil at 100°C. (during circulation) is 20 CPS, and the amount of soot-like solid carbon produced is only 0.1 percent by weight.

In the present invention, no accumulation of coke is observed on the refractory alumina reaction wall of the apparatus. The aforesaid viscosity of the circulated oil and the solid carbon content in the product oil are unchanged throughout the reaction.

The thermal cracking results obtained by using the apparatus of the present invention are as follows, wherein the yields are based upon the weight of the feed oil:

| | |
|---|---|
| Gasification ratio of crude oil | 70% by weight. |
| Yield of acetylene and ethylene | 45% by weight. |
| Yield of tarry matters | 30% by weight. |

What is claimed is:

1. In an apparatus for thermally cracking a heavy hydrocarbon oil comprising a vertical reaction chamber defining a reaction zone having an inlet and an outlet at the top and bottom thereof, respectively, a mixing zone located above said reaction zone and a quench zone, below said mixing zone comprising feed oil and gaseous heating medium inlets positioned so that the feed oil is introduced directly into a stream of said gaseous heating medium, the improvement which comprises the provision of inlet means for introducing a hydrocarbon oil along the walls of the reaction zone, said inlet means being located between said mixing zone and said reaction zone.

2. The apparatus of claim 1 wherein said inlet means are connected to circulating means for circulating at least a portion of a hydrocarbon oil produced in the thermal cracking operation.

3. The apparatus of claim 1 wherein a plurality of additional inlet means for introducing a quenching fluid are provided in the walls of said reaction zone.

4. The apparatus of claim 3 wherein said additional inlet means are positioned at spaced points along the length of the reaction zone such that the reaction time may be controlled by the selective introduction of quenching medium through them.

5. The apparatus of claim 4 wherein said additional inlet means are connected to means for circulating at least a portion of a hydrocarbon oil produced in the thermal cracking operation.

6. The apparatus of claim 1 wherein additional inlet means are positioned between the mixing zone and said inlet means for the introduction of a gaseous medium, said additional inlet means being so disposed that the gaseous medium is directed along the wall in the same direction as said hydrocarbon oil.

7. In a process for thermally cracking a heavy hydrocarbon oil comprising admixing said oil with a gaseous heating medium which has been heated to above 800°C., causing the resulting mixture to flow downwardly through a vertical chamber defining a reaction zone in order to form normally liquid and gaseous reaction products, quenching the reaction mixture upon substantial completion of the reaction, separating the quenched liquid and gaseous products and recovering said products, the improvement which comprises introducing a liquid hydrocarbon oil to the reaction zone such that the walls defining said zone are continuously wetted by a moving film of the liquid hydrocarbon oil, thereby precluding any significant formation of coke upon said walls of the reaction zone due to the contact of normally liquid products with said walls.

8. The process of claim 7 wherein said liquid hydrocarbon oil is introduced at a rate such that it does not absorb sufficient heat to exceed the temperature at which it is thermally stable.

9. The process of claim 7 wherein the liquid hydrocarbon oil comprises, at least in part, recirculated liquid product.

10. The process of claim 7 wherein recirculated liquid product is employed to quench the reaction mixture.

11. The process of claim 7 wherein an additional gaseous medium heated to above 800°C. is introduced along said wall of the reaction zone at a point above the introduction of said liquid hydrocarbon oil, thereby preventing the formation of coke at the wall boundary between the high temperature mixing zone and the point of introduction of the liquid hydrocarbon oil.

* * * * *